E. B. WILES.
GEAR SHIFTING MECHANISM.
APPLICATION FILED OCT. 16, 1916.
1,241,803.
Patented Oct. 2, 1917.
2 SHEETS—SHEET 1.
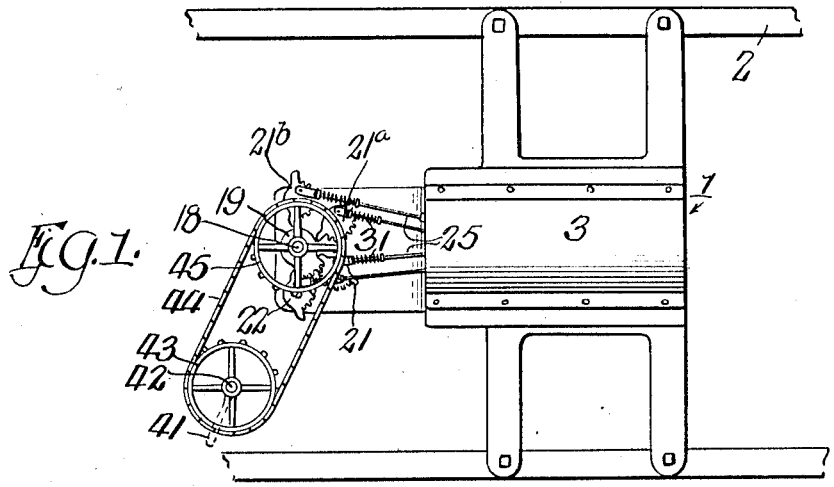
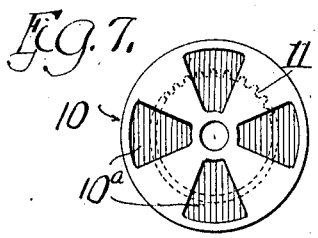
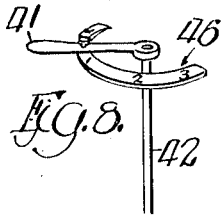
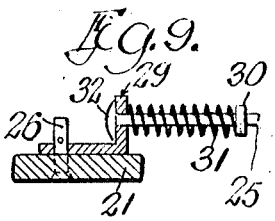
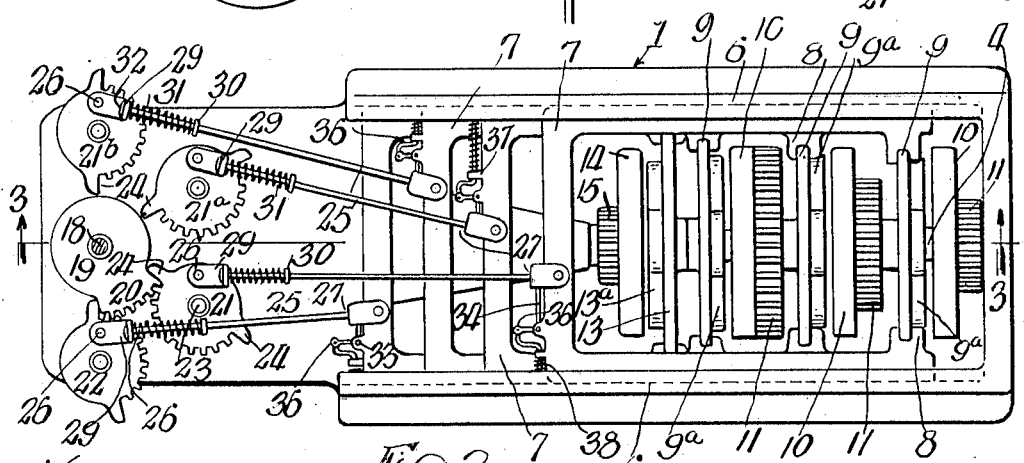
Witnesses:
Inventor
Edwin B. Wiles
by Brown & Mehlhope, Attys

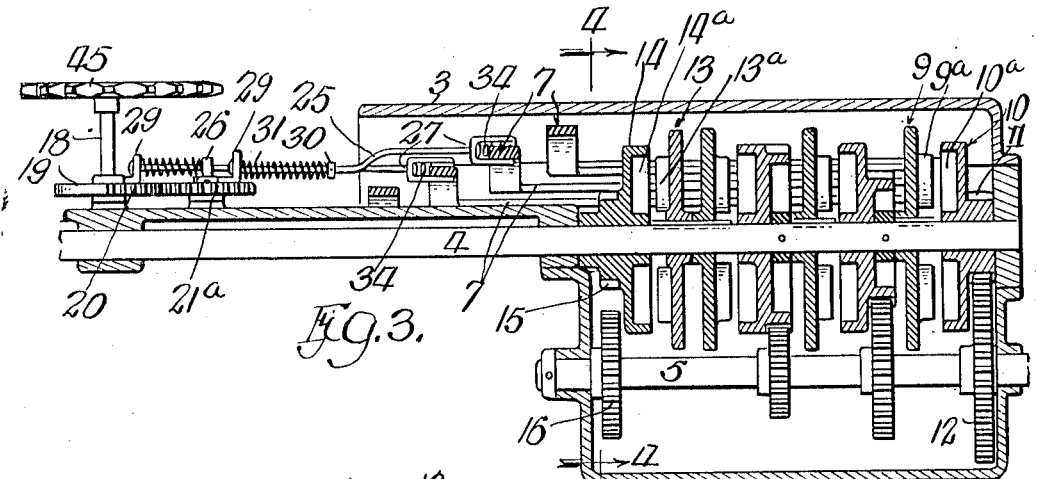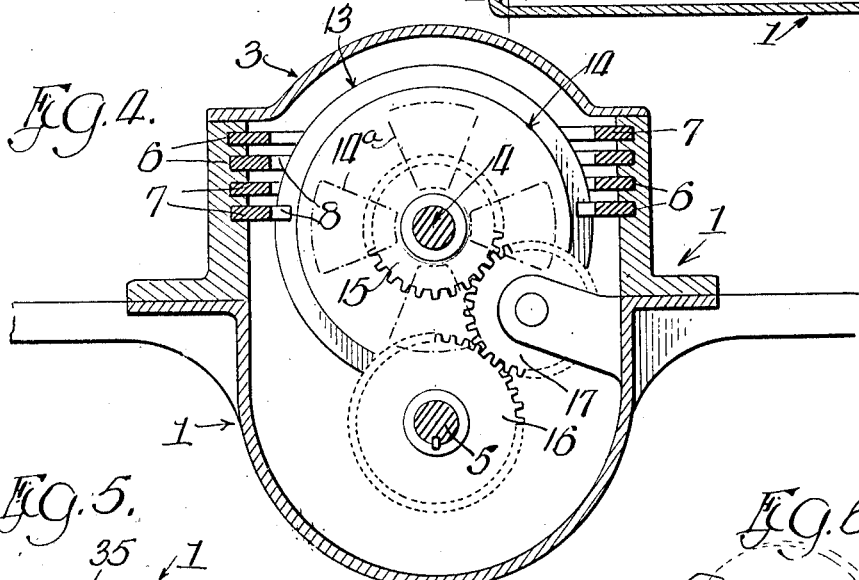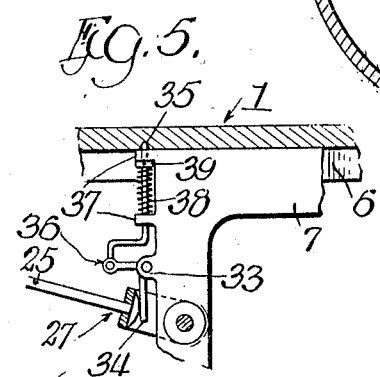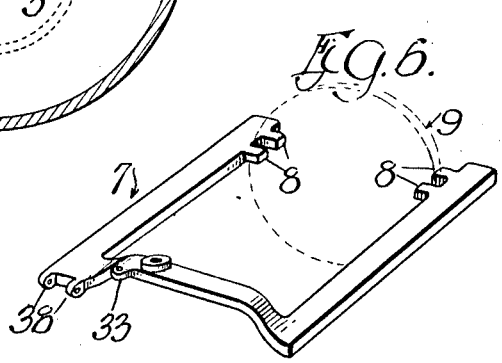

UNITED STATES PATENT OFFICE.

EDWIN B. WILES, OF CHICAGO, ILLINOIS.

GEAR-SHIFTING MECHANISM.

1,241,803.

Specification of Letters Patent.

Patented Oct. 2, 1917.

Application filed October 16, 1916. Serial No. 125,871.

*To all whom it may concern:*

Be it known that I, EDWIN B. WILES, a citizen of the United States, and a resident of Chicago, in the county of Cook and State of Illinois, have invented certain new and useful Improvements in Gear - Shifting Mechanism; and I do hereby declare that the following is a full, clear, and exact description thereof, reference being had to the accompanying drawings, and to the letters of reference marked thereon, which form a part of this specification.

This invention relates to improvements in gear shifting mechanisms and is more particularly adapted for use in shifting the speed transmission gears of automobiles.

A principal feature of my invention includes a plurality of crank disks operated from a single or master operating member, each of said crank disks being connected with one of a plurality of sliding or shifting yokes, said yokes being operatively connected in turn with clutch members so that any desired clutch may be moved into operative engagement with the particular gear which is to be brought into action.

Another feature of the invention embraces a locking device whereby the movable yokes are normally locked to the gear casing against endwise movement in such a manner that the particular yoke desired to be operated may be promptly and automatically unlocked to move its coacting clutch member, which is rotatively fixed to the power shaft, into engagement with its associated gear to impart rotative movement to said gear.

Yet another feature of the invention comprises an adjustable and yielding arrangement of the connecting device between each crank disk and associated yoke, thereby providing a smooth engagement of the two parts of the clutch without jar and insuring prompt and quiet engagement therewith and also the withdrawal of the sliding part of the clutch to its original position when the crank disk is rotated through a predetermined angle of rotation.

These and other objects of the invention will more fully appear as I proceed with the description of the invention, which is illustrated as embodied in an automobile structure.

In the drawings:

Figure 1 shows a plan view of a portion of an automobile frame, to which the transmission gearing casing is attached, with my invention indicated therein.

Fig. 2 is a horizontal, plan view of the transmission case, with the cover removed, showing my gear shifting mechanism.

Fig. 3 is a longitudinal, sectional view, taken centrally on the line 3—3 of Fig. 2.

Fig. 4 is a transverse, vertical sectional view on an enlarged scale, taken upon the line 4—4 of Fig. 3, and looking in the direction indicated by the arrows.

Fig. 5 is a detailed view showing the locking device for one of the sliding yokes.

Fig. 6 is a perspective view of one of the sliding yokes, showing in dotted lines the shifting member of the clutch in position therein.

Fig. 7 is a face view of one of the clutch members.

Fig. 8 shows a detailed view of the operating lever for the shifting device.

Fig. 9 is a detailed sectional view on an enlarged scale, which will be more specifically referred to later.

I find it convenient to locate the major part of the shifting mechanism forming my invention, on the transmission or gearing case 1, which is suitably secured to the frame members 2 of an automobile or other support. The casing is provided with a cover 3. Extending longitudinally through the casing 1 is the engine or driving shaft 4, and beneath the engine shaft and parallel thereto is a driven shaft 5. Located upon the engine shaft, within the casing 1, is a plurality of sets of transmission gears adapted to drive the shaft 5 in a direction opposite to that of the engine shaft, and at different speeds. There is also located within the casing, a set of transmission gears adapted to rotate the driven shaft 5 in a reverse direction. This latter set I call the reversing gears. I will describe but one set of gears of the transmission gears as the same description applies to all.

Located within the casing 2, and longitudinally slidable in guideways 6, formed in the side walls of said casing, is a yoke frame 7, generally rectangular in form as shown in Fig. 6. Interiorly of each side member of this yoke 7, is a pair of lugs 8, 8, affording between each pair, a guideway for one member 9 of the clutch. The member 9 is a disk that is keyed to the engine shaft 4, and therefore adapted to slide longitudinally when the yoke 7 is shifted lengthwise of the casing. The other clutch member 10 is loosely mounted upon the engine shaft 4. The two clutch members 9 and 10 bear upon their proximate faces, male and female engaging clutch devices 9ª and 10ª respectively. When the clutch member 9 is shifted longitudinally upon the shaft 4, the parts 9ª and 10ª interlock in a familiar manner and the rotation of the engine shaft is communicated through the clutch member 9 to the clutch member 10. On the back of the clutch member 10 is a toothed hub 11, the teeth of which engage with a gear 12 fixed upon the driven shaft 5. The relation of the gears 11 and 12 determine the speed at which the shaft 5 is driven when that particular set of gears is used. A different relation in the number of teeth between the gears 11 and 12 of the other sets, affords the differential speeds. Any number of speeds may be employed, but I have shown three sets in the drawing.

The reversing device is of similar construction. That is to say, a disk 13 operatively connected to one of the yokes 7 as before described, is keyed to the shaft 5 and has upon one face male clutch members 13ª, adapted to engage female clutch members 14ª of a clutch disk 14. Integral with the rotatable clutch member or disk 14 is a toothed hub 15 adapted to drive a reversing gear 16 on the shaft 5 through an intermediate gear 17 (see Fig. 4).

It will be observed by reference to Fig. 3, that the rotatable and the sliding clutch members 13 and 14 of the reversing device just described, are similar in construction to the members 9 and 10, but are positioned upon the engine shaft 4 in the opposite relation to that of the members 9 and 10.

Mounted upon a suitable upright shaft 18, is an operating member 19, carrying at one section of its periphery a projecting segmental rack 20 (see Fig. 2). This operating member 19 is designed to engage toothed crank disks that are severally connected with the yokes 7 which control the sliding member of their respective clutches. The segmental rack 20 is adapted for engagement with the teeth on crank disks 21, 21ª, 21ᵇ and with the teeth on a reversing crank disk 22.

Referring now to the crank disk 21, it will be noted that it is rotatably mounted upon a supporting stud 23 and is provided with a pair of projecting stop lugs 24, one at each end of the row of teeth, substantially diametrically oppositely disposed. The faces of these lugs 24 are adapted to engage on the side shoulder or margin of the segmental rack 20 of the operating member 19. A connecting rod 25 is pivotally secured at one end 26 to the crank disk 21 and is pivotally secured at its opposite end 27 to the yoke 7.

Referring more particularly to Fig. 9, the connection between the rod 25 and the crank disk 21 is seen to be as follows: An angle clip 29 pivoted on an upright stud or support 26 on said disk 21, has an upturned, longitudinally apertured end through which the associated end of the rod 25 extends. On the rod 25 is fixed a collar 30 and between the collar 30 and the upturned end of the clip 29 is a spring 31. This end of the rod 25 is provided with a head 32 as shown. It will thus be seen that the rod 27 may slide somewhat through the aperture in the clip 29, and compress the spring 31, while the stud 26 defines the limits of the movements of the rod 27. This movement takes place when the crank disk 21 is rotated by means of the member 19, the compression of the spring 31 taking place during a portion of the rotation of said disk and the expansion of the spring returning the rod to its original position during the other portion of the rotation of said crank disk.

When the crank disk 21 is rotated, the yoke 7 is shifted longitudinally in the grooves 6 in the casing 1, but said yoke must first be unlocked from said casing. This locking and unlocking arrangement is more fully disclosed in Fig. 5. On the yoke 7 is a lug 33 carrying a two part bell crank lever, the two parts being pivotally connected at 36, the handle end of which is indicated at 34 and the locking end of which is indicated at 35. The locking end 36 is straight and passes through a pair of lugs 37 and carries a spring 38 and a collar 39. The spring is located between the collar 39 and one of the lugs 37. The operating or handle end 34 of the two part bell crank lever has operative engagement with the adjacent head on the rod 25. It follows that when the rod 25 is moved to the right from the position indicated in Fig. 5, the lever end 34 will be moved in the same direction and the locking end 35 will be withdrawn from a suitable locking aperture in the side wall of the casing, thus releasing the yoke 7 and permitting said yoke to be shifted or slidingly moved in the guideways under the further movement to the right of the rod 25.

It will also be understood that when the yoke 7 is returned to its original position by the complete rotation of the disk 21 and under the influence of the spring 31, the two part bell crank lever will be released and the spring 38 will force the bolt end 35 into the aperture in the casing and thus again lock the yoke 7. A similar locking arrangement is provided for each of the yokes 7 including that used in connection with the reversing gears.

An operating handle 41 mounted on a convenient upright shaft 42, enables the operator to control the entire shifting mechanism. To the shaft 42 is fixed a sprocket wheel 43 which is connected by a sprocket chain 44 to a sprocket wheel 45 located upon the shaft 18.

An indicating sector 46 is provided conveniently near the handle 41, with suitable symbols thereon to indicate the reverse position of the handle 41 and the position for the first, second or third, or other speeds, employed. Thus the operator, by moving the handle 41, say to the symbol indicated at first speed, through the shaft 42, the sprocket gearing 43, 44 and 45 will operate the main disk 19. The face of the toothed segment on said disk adjacent to the engaging lug 24 on the crank disk 21 will instantly rotate said crank disk and almost instantly bring the teeth thereof into mesh with the segmental teeth on the operating member 19. Thus the crank disk 21 will be rotated in the desired direction and instantly the spring 31 will be compressed and the rod 25 will be moved so as to unlock the associated yoke 7 from the casing 1, and as the disk 21 continues to move in the desired direction, the yoke 7 is further moved lengthwise of said casing and the clutch member 9 carried thereby will be moved longitudinally on the engine shaft 4 into locking engagement with its companion clutch member 10 and the associated gears will be put into mesh so that the shaft 5 will be driven at the desired speed.

When the second speed is desired, the operator simply continues to move the lever 41 past the symbol point indicating the first speed, toward the symbol point indicating the second speed and the same operation will take place with respect to the crank disk 21ª for the second speed with this exception, that as the second crank disk 21 comes into operative relation, the first crank disk 21 is released from operative relation with the operating member 19. Thus, the operator in going to second speed, engages and passes through the first speed and in going to the third speed, engages and passes through the first and second speeds.

The arrangement of the parts, however, is such that between each of said speeds, there is a neutral or inoperative position.

I claim as my invention:

1. The combination of a casing having longitudinally extending guide channels, a shaft, a clutch member including a gear loosely mounted on said shaft, a clutch disk keyed to said shaft and capable of being operatively connected to said gear clutch member, a shifting member for said clutch disk slidably mounted in the guide channels and means for imparting movement to said shifting member to operatively connect said clutch members.

2. The combination of a casing having side walls in which are provided longitudinally extending guide channels, a shaft, a clutch member including a gear loosely mounted on said shaft, a clutch disk keyed to said shaft and capable of being operatively connected to said gear clutch member, a shifting member for said clutch disk having side bars slidably mounted in the guide channels in said casing walls, said side bars of the shifting member engaging the marginal peripheral edges of the clutch disk and means for imparting movement to said shifting member to operatively connect said clutch members.

3. The combination of a casing having longitudinally extending guide channels, a shaft, a clutch member including a gear loosely mounted on said shaft, a clutch disk keyed to said shaft and capable of being operatively connected to said gear clutch member, a yoke movable in the guide channels and adapted to engage said clutch disk, a crank disk, means for imparting a swinging movement to said crank disk and means for translating the swinging movement of the crank disk into a longitudinal sliding movement of the yoke.

4. The combination of a casing provided with longitudinally extending guide channels, a shaft, a clutch member including a gear loosely mounted on said shaft, a clutch disk keyed to said shaft and capable of being operatively connected to said gear clutch member, a U-shaped yoke movable in said guide channels and having spaced ends to operatively engage the clutch disk, means normally locking said yoke in said channels when the said clutch members are disengaged, a crank disk adapted for a swinging movement, and a rod connecting said crank disk with the said yoke, said rod acting to release the locking means before imparting movement to said yoke.

5. The combination of a casing having longitudinally extending guide channels, a shaft, a clutch member including a gear loosely mounted on said shaft, a clutch disk keyed to said shaft and capable of being operatively connected to said gear clutch member, a U-shaped yoke movable in the guide channels and adapted to engage with the clutch disk, means normally locking said yoke in said channels when the said clutch members are disengaged, a crank disk adapted for a swinging movement, a rod connecting said crank disk with said U-shaped yoke and a spring on said rod acting against two abutments, one on said rod and one on said disk, said rod including a yielding means and translating the swinging movement of said crank disk into longitudinal sliding movement of said yoke and acting to release said yoke locking means during the compression of said spring before imparting movement to said yoke.

6. The combination of a casing provided with longitudinally extending guide channels, a shaft, a clutch member including a gear loosely mounted on said shaft, a clutch disk keyed to said shaft and capable of being operatively connected to said gear clutch member, a U-shaped yoke movable in said guide channels and provided with spaced end to operatively engage the clutch disk, means carried by the yoke to automatically lock said yoke to said casing when said clutch members are disengaged, a disk adapted for a partial swinging movement and provided with a crank pin, a rod including at one end a yielding device operatively connecting said crank pin with the yoke and including at its other means for automatically releasing the locking means.

7. A mechanism of the character described comprising a casing, a shaft, a plurality of spaced clutch members arranged in pairs on said shafts, yokes adapted for longitudinal shifting movement in said casing, one yoke being associated with each pair of clutch members, a master operating member having a segmental rack, a plurailty of crank disks spaced about said master operating member, one of said crank disks being associated with each of said yokes, said crank disks having segmental racks adapted to be successively engaged by the rack on said master operating member and a rod operatively connecting each crank disk with an associated yoke.

8. A mechanism of the character described comprising a casing, a shaft, a plurality of spaced clutch members arranged in pairs on said shafts, yokes adapted for longitudinal shifting movement in said casing one yoke being associated with each pair of clutch members, means carried by each of said yokes for automatically locking it against movement when the clutch members associated therewith are disengaged from each other, a master operating member having a segmental rack, a plurality of crank disks spaced about said master operating member, one of said crank disks being associated with each of said yokes, said crank disks having segmental racks adapted to be successively engaged by the rack on said master operating member and a rod operatively connecting each crank disk with an associated yoke, said rods acting to unlock said yokes from said casing before imparting shifting movement to said yokes.

9. A mechanism of the character described comprising a casing, a shaft, a plurality of spaced clutch members arranged in pairs on said shafts, yokes adapted for longitudinal shifting movement in said casing, one yoke being associated with each pair of clutch members, means carried by each of said yokes for automatically locking it against movement in said casing when the clutch members associated therewith are disengaged from each other, a master operating member having a segmental rack, a sprocket wheel associated with said master operating member, a plurality of crank disks spaced about said master operating member, one of said crank disks being associated with each of said yokes, said crank disk having segmental racks adapted to be successively engaged by the rack on said master operating member, and a rod operatively connecting each crank disk with an associating yoke, said rods acting to unlock said yoke from said casing before imparting shifting movement to said yoke, a second sprocket spaced from the sprocket wheel associated with said master operating member, a chain connecting said sprocket wheel and an operating lever adapted to impart rotative movement to said last mentioned sprocket wheel.

10. A mechanism of the character described, comprising a casing, a shaft, a plurality of shiftable clutch members on said shaft, a master operating member, a plurality of crank members spaced about said master operating member, there being a crank member associated with each clutch member on said shaft, said master operating member and said crank members having means adapted for operative engagement when said master member is operated to successively actuate said crank members, and means operatively connecting said crank members with their associated clutch members to shift said clutch members on said shaft when said crank members are operatively engaged by the said master operating member.

11. A mechanism of the character described, comprising a casing, a shaft, a plurality of shiftable clutch members on said shaft, a master operating member having a segmental rack, a plurality of segmental rack crank disks spaced about said master operating member, there being a segmental crank disk associated with each clutch member on said shaft, said master operating member when rotated being adapted to successively engage and rotate said segmental crank disks, and means operatively connecting said crank members with their associated clutch members to shift said clutch members on said shaft when said crank members are operatively engaged by said master operating member.

12. A mechanism of the character described, comprising a casing, a shaft, a plurality of shiftable clutch members on said shaft, a yoke associated with each clutch member, a master operating segmental rack, a plurality of segmental rack disks spaced about said master operating rack, there being a segmental rack disk associated with each clutch yoke, a crank pin on each segmental rack disk, said master operating rack when operated being adapted to successively engage and actuate said segmental rack disks, and rods operatively connecting each crank pin with an associated clutch yoke to shift said yoke and associated clutch member on said shaft when said segmental rack disks are actuated by said master operating segmental rack.

13. A mechanism of the character described, comprising a casing, a shaft, a plurality of shiftable clutch members on said shaft, a yoke associated with each clutch member, a master operating segmental rack, a plurality of segmental rack disks spaced about said master operating member, there being a segmental rack disk associated with each clutch yoke, a crank pin on each segmental rack disk, said master segmental rack when operated being adapted to successively engage and actuate said segmental rack disks, rods operatively connecting said crank pins with the associated clutch yokes, to shift said yokes and associated clutch members on said shaft when said segmental rack disks are actuated by said master operating rack, and means automatically locking each of said segmental rack disks against movement other than that imparted to them by said master operating segmental rack.

In testimony that I claim the foregoing as my invention I affix my signature in the presence of two witnesses, this 14th day of October, A. D. 1916.

EDWIN B. WILES.

Witnesses:
 TAYLOR E. BROWN,
 FRED B. WILES.

Copies of this patent may be obtained for five cents each, by addressing the "Commissioner of Patents, Washington, D. C."